United States Patent [19]
Joh

[11] Patent Number: 5,666,488
[45] Date of Patent: Sep. 9, 1997

[54] PORT EXPANSION NETWORK AND METHOD FOR LAN HUBS

[75] Inventor: Clarence Chulljoon Joh, Allentown, Pa.

[73] Assignee: Lucent Technologies Inc., Murray Hill, N.J.

[21] Appl. No.: 343,286

[22] Filed: Nov. 22, 1994

[51] Int. Cl.$^6$ .................................................. G06F 13/00
[52] U.S. Cl. .............................. 395/200.83; 395/200.55; 370/452; 370/461; 370/431; 370/458
[58] Field of Search ............... 395/200, 200.01–200.09, 395/200.1, 200.11–200.19; 370/85, 94, 85.1, 85.2, 85.6, 94.3

[56] References Cited

U.S. PATENT DOCUMENTS

| | | | |
|---|---|---|---|
| 3,633,169 | 1/1972 | Bickford | 395/200.01 |
| 4,513,373 | 4/1985 | Sheets | 395/500 |
| 4,536,877 | 8/1985 | Livingston et al. | 370/488 |
| 4,570,167 | 2/1986 | Sugitani et al. | 347/65 |
| 4,608,685 | 8/1986 | Jain et al. | 370/352 |
| 4,637,015 | 1/1987 | Bobey | 370/431 |
| 4,674,085 | 6/1987 | Aranguren et al. | 370/408 |
| 4,701,756 | 10/1987 | Burr | 340/825.02 |
| 4,787,082 | 11/1988 | Delaney et al. | 370/216 |
| 4,787,083 | 11/1988 | Tanaka | 395/752 |
| 4,805,169 | 2/1989 | Van Asselt | 370/445 |
| 4,825,435 | 4/1989 | Amundsen et al. | 370/501 |
| 4,866,702 | 9/1989 | Shimizu et al. | 370/438 |
| 4,866,704 | 9/1989 | Bergman | 370/452 |
| 4,872,158 | 10/1989 | Richards | 370/58.1 |
| 4,982,400 | 1/1991 | Ebersole | 370/407 |
| 4,998,247 | 3/1991 | Irvine-Halliday et al. | 340/825.5 |
| 5,014,269 | 5/1991 | Picandet | 370/438 |
| 5,018,139 | 5/1991 | Despres | 370/407 |
| 5,041,963 | 8/1991 | Ebersole et al. | 370/407 |
| 5,042,031 | 8/1991 | Yokoyama et al. | 370/223 |
| 5,043,938 | 8/1991 | Ebersole | 395/200.2 |
| 5,237,567 | 8/1993 | Nay et al. | 370/438 |
| 5,239,673 | 8/1993 | Natarajan | 370/336 |
| 5,319,644 | 6/1994 | Liang | 370/452 |
| 5,345,447 | 9/1994 | Noel | 370/67 |
| 5,392,285 | 2/1995 | Kurts | 370/85.2 |
| 5,463,741 | 10/1995 | Levenstein | 395/200.13 |
| 5,467,351 | 11/1995 | Baumert | 370/85.1 |
| 5,469,438 | 11/1995 | Baumert et al. | 370/85.11 |
| 5,495,589 | 2/1996 | Mackenthun et al. | 395/200.15 |
| 5,519,709 | 5/1996 | Albrecht et al. | 370/94.3 |

OTHER PUBLICATIONS

"Draft Standard—Information Technology Local and Metropolitan Networks—Part 12: Demand Priority Access Method and Physical Layer Specifications", Sponsor: Lan Man Standards Committee of the IEEE Computer Society, P802.12, Mar. 1994.

"Demand Priority Preliminary Draft", Submitted to IEEE 802.12, Jan. 1994.

Primary Examiner—Christopher B. Shin

[57] ABSTRACT

An expandable local area hub network is provided by the present invention. The network comprises a plurality of hubs connected along a common memory bus. Each hub includes a plurality of ports for interfacing with remote stations. An arbiter is coupled to the hubs for granting a hub controlling access to the memory bus to transmit a packet on the memory bus. In use, the arbiter receives requests from the hubs and designates a hub, based upon an internal protocol, temporary bus master hub by granting the temporary bus master hub controlling access to the memory bus.

18 Claims, 3 Drawing Sheets

PORT EXPANSION NETWORK AND METHOD FOR LAN HUBS

FIELD OF THE INVENTION

The present invention relates to local area networks and, more particularly, to an extendable, round robin, local area hub network, such as may be employed, for example, in computer communications.

BACKGROUND OF THE INVENTION

With the recent expansion in the use of computers and computer terminals it is not unusual to have a large number of computers and terminals within a limited local area. It is very desirable to couple these units together to allow sharing of resources and permit a single terminal to access a plurality of other computers or terminals. One way of accomplishing this is the local area network (LAN). A local area network provides switching and data distribution for the transmission of information and allows computers to communicate with each other. LAN's further allow any single terminal to have access to a multiplicity of computers and peripheral equipment.

Local Area Networks, such as are used, for example, in computer communications, are well known and described in U.S. Pat. No. 5,041,963, entitled, "Local Area Network with an Active Star Topology Comprising Ring Controllers having Ring Monitor Logic Function", by Ebersole et al., issued Aug. 20, 1991; U.S. Pat. No. 4,998,247, entitled, "Active Star-Configured Local Area Network", by Irvine-Halliday et al., issued Mar. 5, 1991; U.S. Pat. No. 4,982,400 entitled, "Ring Bus Hub for a Star Local Area Network", by Ebersole, issued Jan. 1, 1991; U.S. Pat. No. 4,825,435, entitled "Multiport Repeater", by Amundsen et al., issued Apr. 25, 1989; U.S. Pat. No. 4,872,158, entitled, "Distributed Control Rapid Connection Circuit Switch", by Richards, issued Oct. 3, 1989; U.S. Pat. No. 4,787,082, entitled, "Dataflow Control Arrangement for Local Area Network", by Delaney et al., issued Nov. 22, 1988; U.S. Pat. No. 4,674,085, entitled, "Local Area Network", by Aranguren et al., issued Jun. 16, 1987; all of the foregoing being incorporated by reference.

The stations or nodes of a local area network may be configured in a variety of shapes, such as, for example, as a ring or a star. In a star-configured or local area hub network, multiple, discrete, remote stations are coupled through a central site or station, termed a hub station. The hub station follows a particular or predetermined signaling protocol to establish communications and to determine the order in which remote stations are permitted to transmit data over the network in the form of signals, such as electrical or optical signals. In one such signaling protocol, termed round robin, each of the remote stations is separately polled for transmissions. Likewise, in a round robin signaling protocol, only one station may transmit electrical signal data over the network at a time; that is, only one station may have controlling access to transmit a packet on a memory bus.

According to a ring network topology, transmission is from node to node around a closed loop and each node may alter the data passing therethrough. Each data processing device is connected to a separate node and intercepts only data messages specifically directed to a node. Since the data flows through each node and since the nodes are distributed, no central node may be separately secured and hence, the security and privacy of a ring network topology is somewhat less than that of the star network topology. Additionally, all nodes are in one closed loop and, failure of a single node may render the whole ring network inoperative. The closed loop topology also limits flexibility in some arrangements where adding new nodes or data processing stations results in the loss of data.

As with the star topology discussed above, hubs in a ring topology must follow a particular or predetermined signaling protocol to establish communications and to determine the order in which remote stations are permitted to transmit data over the network in the form of signals. The round robin signaling protocol discussed above is one such protocol and is applicable to a ring topology in the same manner it applies to a star topology.

Data transmission in a bus network topology is typically broadcast from one source to all other devices on the same bus, but is normally only accepted by the device to which it is specifically addressed. Individual data processing devices are programmed to recognize data messages addressed to or intended for them as they pass them by on the bus. The reliability of the bus network topology, in terms of network node failure, is greater than that of the ring network topology, although a break in the bus may be catastrophic. There is also greater flexibility in adding new data processing devices to the system than is normally possible with the star topology since no wiring reconfiguration is required. Although a round robin protocol is generally not applicable to a bus topology, it might be applicable if one hub is designated as the controlling hub. If this were the case, the controlling hub would be programmed with logic to govern the remaining hubs in accordance with the round robin protocol.

As disclosed and described in *Draft for Standard Information Technology Local and Metropolitan Networks—Part 12—Demand Priority Access Method and Physical Layer Specification*, P802.12, dated March 1994, herein incorporated by reference, a round robin protocol has been proposed to the IEEE to be employed in the local area networks transmitting data in the form of electrical signals 100 megabits per second, termed 100 Base VG. A round robin protocol provides advantages over other known network protocols, such as the protocol employed by the IEEE standard 802.3, also known as CSMA/CD (Carrier Sense Multiple Access with Collision Detection). The advantages associated with the round robin protocol are especially applicable for time sensitive multimedia communication tasks. Specifically, in multimedia applications it becomes desirable to prioritize or control access to the media or communication networks provided to different remote stations. The prioritized or controlled access permits more important communications tasks to obtain access to the network earlier than the less important tasks.

Several different media can be used to carry local area network communications. Considerations regarding network topology, maximum distance between nodes, volume of information to be transmitted, and speed of transmission are critical in a selecting particular communications medium. Physical limitations such as plenum, conduit sizes, and routing plans in the building also affect the choice of the medium. Finally, for some network topologies, user accessibility to the bus for passive tapping is also extremely important.

FIG. 1 is a schematic diagram of one embodiment of a conventional local area star-configured or hub shaped network. As previously suggested, in a local area hub network, the remote stations 10 may be arranged in a star-shaped network, or in a star configuration, in which a central station acts as a hub 12 for the remote stations 10. Thus, a hub or hub station may be used to transmit a signal packet, such as an electrical signal packet, from one remote station to another remote station, or multiple remote stations, since all of the remote stations are in direct communications with, or directly coupled to, the hub. Remote stations may comprise, for example, a data terminal or other computer-related equipment, as described in the aforementioned *Demand Priority Access* document.

In the context of the invention, the term "packet" refers to a complete and discrete grouping of data in the form of signals, typically digital signals, for transmission between stations. Thus, for example, a packet may comprise digital signals to be transmitted. Typically, packets include a start of frame delimiter (SFD), and an end of frame delimiter (EFD). Likewise, as described on page 4-3 of the aforesaid *Demand Priority Access* document, and as illustrated in FIG. 2, a packet may further include binary digital signals, or bits, representing, for example, a destination address (DA), a source address (SA), the length of the packet (L), the data to be transmitted (DATA), and a frame check sequence (FCS) for signal error checking.

In the network illustrated in FIG. 1, packets, such as electrical signal packets, transmitted between two remote stations must pass through the hub. Depending on the particular network, the hubs typically have the capability to perform and recognize a signaling protocol (often termed "handshaking"), the capability to identify and extract data from an electrical signal packet, the capability to store data in the form of electrical signals, the capability to perform signal error checking, and the capability to perform destination address matching, such as described in the aforementioned *Demand Priority Access* document.

For a local area hub network, it often becomes desirable to increase the size of the network without substantially degrading signal transmission performance; that is, it is desirable for the network to be extendible. However, as local area hub networks increase in size, the hardware for communications between remote stations of the network becomes increasingly complex. For example, technological limitations on the manufacture of integrated circuit chips typically restrict the number of ports that may be fabricated on one chip. Specifically, in any integrated chip implementation of a multiple-port LAN hub the number of user ports is usually limited to between six and twelve per single hub integrated chip due to physical limitation. Thus, for a large local area hub network having, for example, tens or hundreds of stations, communications between the remote stations directly linked or coupled to one hub station in the network may need to be shared among several, discrete devices or chips. Additionally, since all the network traffic must go through a specific hub, the bandwidth available to each port decreases as more ports are added to the hub. Further, the problem of performing or controlling round robin polling between these discrete devices also becomes more complex.

One way to overcome the limited number of ports available on a signal hub is the coupling of hubs to form a local area hub network consisting of multiple hubs. For such a local area hub network, the hubs should be coupled and signals must be communicated between the hubs so that the performance of the round robin signaling protocol is not substantially degraded. Furthermore, it is desirable not to increase the complexity of the hardware unduly and to exhibit low pin or port overhead by reducing the number or maintaining a relatively low number of ports needed to accomplish satisfactory operation.

In view of the foregoing discussion a need exists for an extendable local area hub network which efficiently, reliably and functionally increases the number of ports available on a local area hub network. The present invention provides such a network.

SUMMARY OF THE INVENTION

An expandable local area hub network is provided by the present invention. The network comprises a plurality of hubs connected along a common memory bus. Each hub includes a plurality of ports for interfacing with remote stations. An arbiter is coupled to the hubs for granting a hub controlling access to the memory bus to transmit a packet on the memory bus. In use, the arbiter receives requests from the hubs and designates a hub, based upon an internal protocol, temporary bus master hub by granting the temporary bus master hub controlling access to the memory bus.

An alternate embodiment comprises a first set of hubs and a second set of hubs coupled along a common memory bus, wherein each hub includes a plurality of ports for interfacing with remote stations. A first branch arbiter is coupled to the first set of hubs for designating a hub, based upon an internal protocol, temporary bus master hub by granting the temporary bus master hub controlling access to the memory bus for transmission of a packet on the memory bus.

The network further includes a second branch arbiter coupled to the second set of hubs for designating a hub, based upon an internal protocol, temporary bus master hub by granting the temporary bus master hub controlling access to the memory bus for transmission of a packet on the memory bus. Further, a root arbiter is also coupled to the first branch arbiter and the second branch arbiter. The root arbiter grants requests made by said first branch arbiter and said second branch arbiter based upon internal protocols.

In use, the first branch arbiter may only grant a hub controlling access to the memory bus when the root arbiter has granted a request of the first branch arbiter for controlling access to the memory bus and the second branch arbiter may only grant a hub controlling access to the memory bus when the root arbiter has granted a request of the second branch arbiter for controlling access to the memory bus.

Other objects, advantages and salient features of the invention will become apparent from the following detailed description, which taken in conjunction with the annexed drawings, discloses the preferred embodiment of the present invention.

DETAILED DESCRIPTION OF THE PREFERRED EMBODIMENTS

The present invention provides an efficient and elegant method for expanding, in parallel fashion, the number of available ports in a local area hub network operating under the 100Base VG round robin protocol disclosed in the aforementioned *Demand Priority Access* document.

Figure 1:
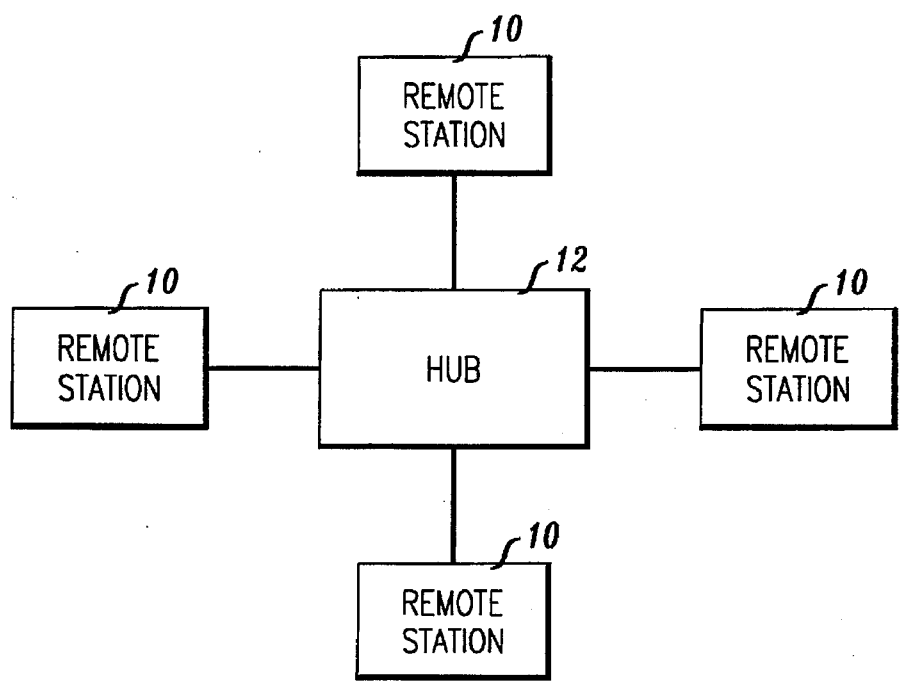
FIG. 1 is a schematic representation of the a central hub connected to a series of remote stations.
Figure 2:
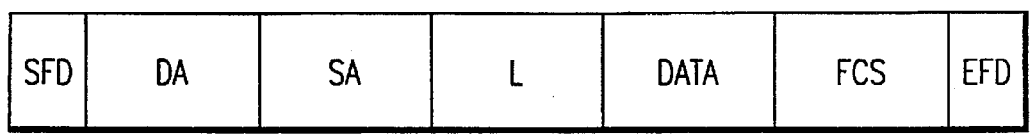
FIG. 2 is a schematic representation of a packet.
Figure 3:
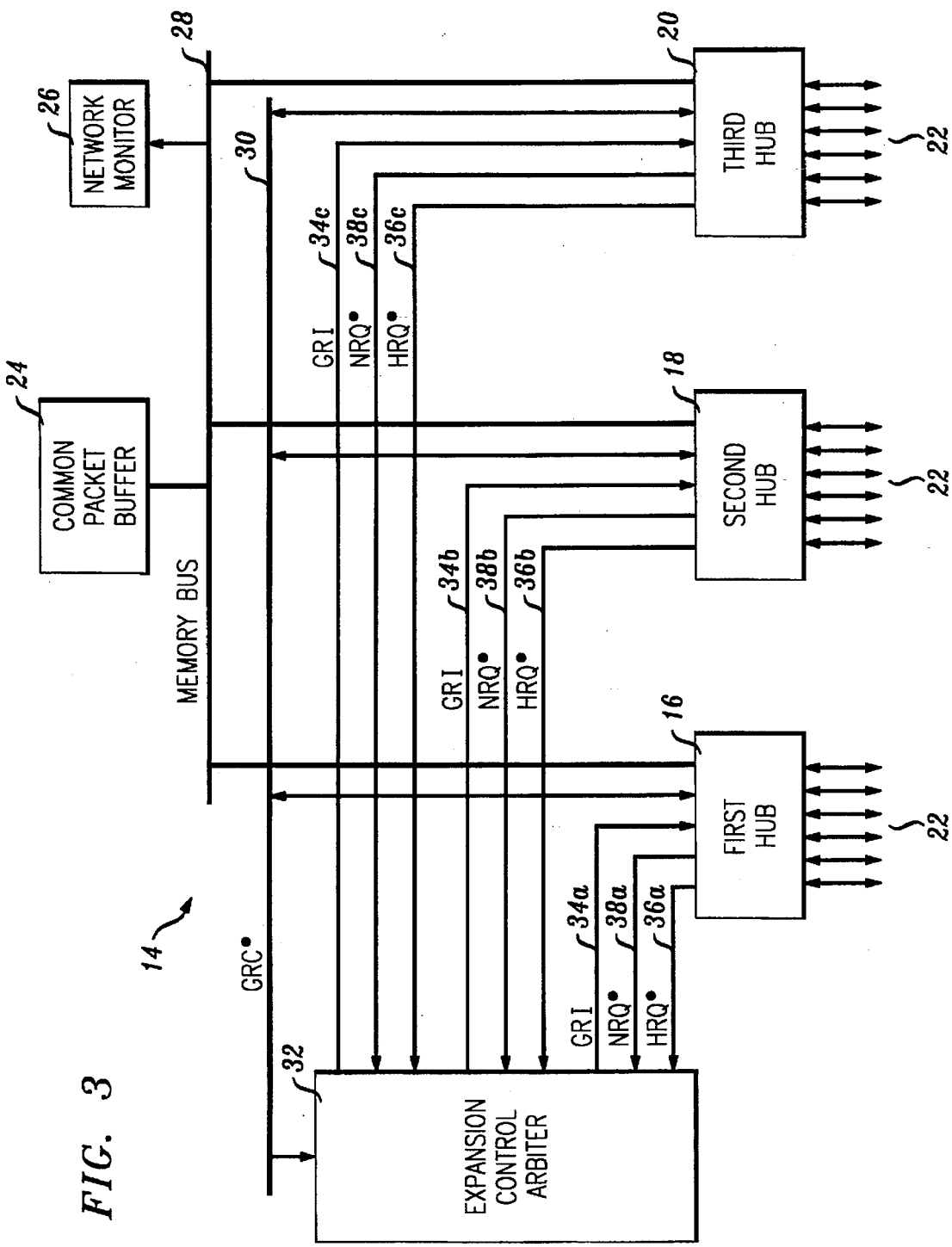
FIG. 3 is a schematic representation of a first embodiment in accordance with the present invention.

With reference to FIG. 3, the network 14 includes three hubs, first hub 16, second hub 18, and third hub 20. The hubs are preferably, 100Base VG-protocol LAN hubs, and more particularly, 100Base VG Hub chip. As shown in FIG. 3, each hub includes 6 ports 22, although additional ports are possible without departing from the spirit of the invention, if the hub is physically able to accommodate the additional hubs.

First hub 16, second hub 18, and third hub 20 are each coupled to a common packet buffer 24 and a network monitor 26 via a common memory bus 28. The packet buffer 24 is capable of storing packet information transmitted on the memory bus 28, while the network monitor 26 enables a network administrator, or other interested individual, to monitor activity on the network 14.

Additionally, each of the hubs is coupled to a Grant Captured (GRC) line 30. Each hub has continuous access to the GRC line 30 to signal other hubs that a specific hub has been granted controlling access to the memory bus 28, that is, which hub is the temporary bus master hub. The hubs also monitor the GRC line 30 to determine whether other hubs have been granted controlling access. Specifically, a hub is granted controlling access to the memory bus when the arbiter transmits the Grant In (GRI) signal to a hub and that hub has the GRI signal captured. Only when a hub has controlling access to the memory bus is the hub permitted to transmit a packet on the memory bus.

First hub 16, second hub 18 and third hub 20 are also individually coupled to an expansion control arbiter 32. The arbiter 32 controls the designation of the temporary bus master hub. In response to Grant Requests, the arbiter designates the temporary bus master hub by transmitting a Grant In (GRI) signal to the appropriate hub via GRI lines 34a, 34b, 34c respectively connected between each hub and the arbiter 32. Transmission of the GRI signal provides the hub with controlling access to the memory bus 28, designating the hub as the temporary bus master hub. The arbiter 32 is also coupled to the GRC line 30 for monitoring which hub is the temporary bus master hub.

Grant Requests, High Priority Requests (HRQ) and Normal Priority Requests (NRQ), for controlling access to the memory bus to transmit a packet are made by the hubs via HRQ lines 36a, 36b, 36c and NRQ lines 38a, 38b, 38c, respectively, in a manner that will be discussed in more detail below. Although only two priority levels are disclosed, a wide variety of priority levels could be implemented without departing from the spirit of the present invention.

According to the present invention, each hub receives requests from its respective remote stations. When the requests are received, the respective hub decodes the packet transmitted by the remote station, descrambles the packet and makes a request for controlling access to the memory bus 28 based upon the priority information found in the packet. Specifically, either an HRQ or a NRQ is transmitted to the arbiter via the HRQ or NRQ line, respectively.

When the expansion control arbiter 32 receives Grant Requests (HRQ or NRQ) from hubs with pending requests from their respective ports, the expansion control arbiter 32 issues a Grant In (GRI) signal to one of the hubs according to the round robin protocol. However, the GRI signal is issued only when the Grant Capture (GRC) signal is idle, that is when no hub has transmitted a GRC signal on the GRC line 30. When the expansion control arbiter 32 designates a GRI signal to a hub, that hub transmits a GRC signal to the common GRC line 30 and becomes the temporary bus master hub.

At this point, the temporary bus master hub simultaneously dispatches the packet to the address matching unit and the common memory buffer 24 in bytes. The temporary bus master hub's address matching unit then reviews the destination address of the hub to determined whether the packet is being directed to another remote station connected to the temporary bus master hub. With regard to the transmission of the packet to the common packet buffer 24, each of the hubs connected to the common memory bus 28 will decode the destination address of the packet, determine whether the packet is intended for one of the remote stations coupled to their ports, and capture the packet if the packet is intended for one of their remote stations.

If the packet is unicast and destined for another port of the temporary bus master hub, the broadcast of the packet to the memory bus is a wasted motion, although no harm is done. Specifically, the temporary bus master hub, after realizing that the packet is destined for one of its own ports, retrieves the packet from the memory bus 28 and transmits it to the intended port and remote station.

If the packet is unicast and destined to one of the other hubs connected to the memory bus 28, the destination hub will identify the destination address through its address matching unit and capture the packet (even though it is not the temporary bus master hub). In contrast to the previous situation where the packet was destined for another port of the temporary bus master hub, the temporary bus master (and originating) hub does not transmit the packet to one of its own output ports.

If, on the other hand, the packet is multicast or broadcast, the temporary bus master hub immediately transmits the packet to the common packet buffer 24 via the memory bus 28. While the dispatched packet is on the memory bus 28, each of the hubs decodes the destination address of the packet, and determines whether the packet is intended for one of the remote stations coupled to their ports. All interested hubs, including the temporary bus master hub, will then capture the dispatched packet and transmit the packet to the appropriate remote stations.

Once the temporary bus master hub has transmitted the requested packet for which its was granted controlling access to the memory bus 28, the temporary bus master hub notifies the expansion control arbiter 32 and releases its mastership by releasing the GRC line 30. Release of the GRC line 30 is accomplished by withdrawing the previous GRC signal sent by the temporary bus master hub. The expansion control arbiter 32 then passes the GRI signal to another hub depending upon its internal round robin protocol. Specifically, each hub is granted controlling access to the memory bus 28, that is, designated the temporary bus master hub, for the purpose of transmitting a single packet based upon a single request from one of the hub's ports. In this way the arbiter 32 has complete control over the order in which requests are accommodated and packets are transmitted over the memory bus 28.

For example, if the temporary bus master hub has been granted the mastership with a Normal Priority Grant request, and if the expansion control arbiter 32 identifies a High Priority Grant request from another hub, the expansion control arbiter 32 will move the HRQ ahead of all the pending NRQs. The arbiter 32 then takes the GRI signal from the temporary bus master hub by notifying the temporary bus master hub that it should release the bus mastership. The temporary bus master hub then completes its current packet transmission and releases the mastership. This is accomplished by releasing the GRC line 30. The arbiter 32 then grants the hub making the HRQ controlling access to the memory bus 28 and designates the hub as the temporary bus master hub.

Similarly, if the temporary bus master hub (which has been given the mastership based upon NRQs) identifies an HRQ from one of its own ports, the temporary bus master hub will notify the expansion control arbiter 32 through the HRQ line. The arbiter 32 will then record the HRQ in one of its internal registers for bookkeeping purposes, but will not otherwise change anything. The sequence for controlling access will then following the round robin protocol in the manner discussed above.

In use, the present invention functions in the following manner. Assuming the first hub 16, second hub 18, and third hub 20 make a variety of Normal Priority Grant Requests, the arbiter 32 designates the temporary bus master hub in accordance with round robin protocol. As a result, the Grant In signal will be successively transmitted to each hub as the round robin protocol dictates. This will continue until a High Priority Grant Request is received by the arbiter 32.

Assume the first hub 16 is the temporary bus master hub when the second hub 18 makes a HRQ. At this point, the arbiter 32 will move the second hub's HRQ ahead of all the pending NRQ's. The arbiter 32 will then take the GRI signal from the first hub 16 by notifying the first hub 16 that it should release the bus mastership. The first hub 16 then completes its current packet transmission and releases the mastership. Once again, this is accomplished by releasing the GRC line 30. The arbiter 32 then grants the second hub 18 controlling access to the memory bus 28 and designates the second hub 18 the temporary bus master hub. The second hub 18 then sends a GRC signal over the GRC line 30. If the HRQ had come from the first hub 16, while the first hub 16 was the temporary bus master hub, the arbiter 32 would have followed the same procedure set forth above, with the exception of granting the GRI back to the first hub 16 after it released the GRC line.

Figure 4:
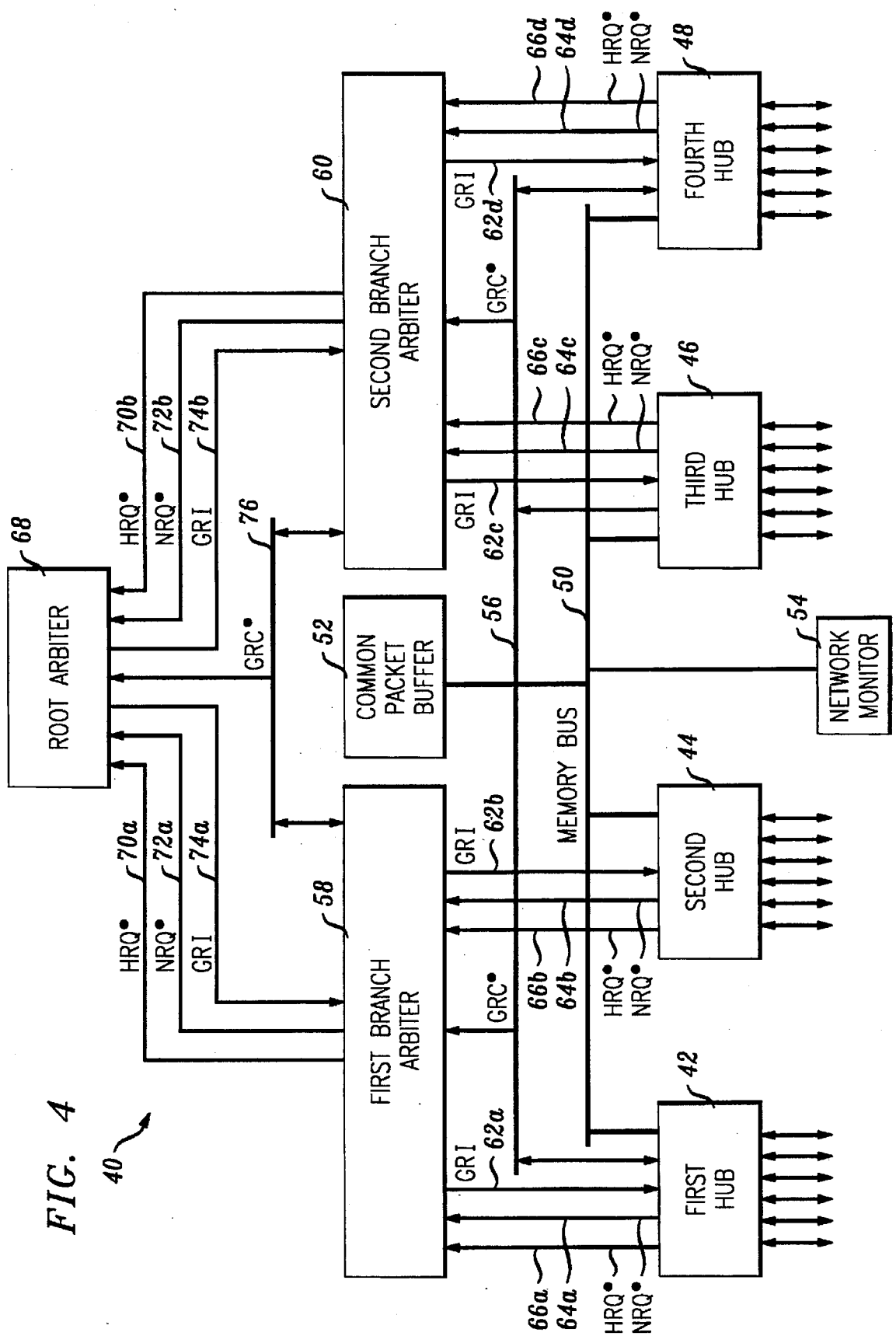
FIG. 4 is a schematic representation of a second embodiment in accordance with the present invention.

A second embodiment of the present invention is shown in FIG. 4. The second embodiment provides a hierarchial system based upon the same basic principles of the first embodiment. The disclosed network 40 includes four hubs, first hub 42, second hub 44, third hub 46 and fourth hub 48, although additional hubs, or fewer hubs, could be implemented without departing from the spirit of the present invention.

At the first level of the hierarchy, the four hubs are individually coupled to a common memory bus 50 linking all of the hubs to a common packet buffer 52. A network monitor 54 is coupled to the memory bus to permit an administrator to monitor the network. Additionally, all of the hubs are individually coupled to a common primary Grant Capture (GRC) line 56.

The first hub 42 and second hub 44 are coupled to a first branch arbiter 58, while the third hub 46 and fourth hub 48 are similarly coupled to a second branch arbiter 60. Linkage of the hubs with their respective branch arbiters permits transmission of primary Grant In (GRI) signals from the branch arbiter to respective hubs via primary GRI lines 62a, 62b, 62c, 62d, as well as the transmission of primary Grant Requests (NRQ or HRQ) from the hub to the branch arbiter via respective primary NRQ lines 64a, 64b, 64c, 64d and HRQ lines 66a, 66b, 66c, 66d.

At the second level of the hierarchy, the first branch arbiter 58 and second branch arbiter 60 are coupled to a root arbiter 68. Linkage between the branch arbiters and the root arbiter 68 permits the transmission of secondary Grant Requests (HRQ or NRQ) from the branch arbiters to the root arbiter via secondary HRQ lines 70a, 70b and secondary NRQ lines 72a, 72b, while secondary GRI signals are transmitted from the root arbiter to the branch arbiters via secondary GRI lines 74a, 74b.

Additionally, a secondary GRC line 76 is provided. The secondary GRC line 76 is coupled to the root arbiter 68, the first branch arbiter 58 and the second branch arbiter 60 permitting the branch arbiters to send a signal indicating which branch arbiter has controlling access, that is, which branch arbiter has been granted the secondary Grant In signal.

According to the second embodiment, when the either of the branch arbiters receives primary Grant Requests (HRQ or NRQ) from respective hubs with pending requests from their respective ports, the branch arbiters forward the primary Grant Request to the root arbiter 68 by making a secondary Grand Request to the root arbiter 68. The root arbiter 68 then makes a determination and issues a secondary Grant In (GRI) signal to one of the branch arbiters based upon its internal round robin protocol. Issuance of the secondary GRI is provided so long as the secondary Grant Capture Signal (GRC) is idle.

When the root arbiter designates a secondary GRI signal to a branch arbiter, that branch arbiter sends a GRC signal to the common secondary GRC line 76 and becomes the master branch arbiter. The designated branch arbiter remains the master branch arbiter until it accommodates all of the requests made by the hubs connected thereto or until a High Priority Grant Request is made by one of the hubs connected to the other branch arbiter.

After receiving controlling access, the master branch arbiter sends a primary GRI signal to the appropriate hub. The designated hub then sends a primary GRC signal to the primary GRC line 56 and becomes the temporary bus master hub. In designating the temporary bus master hub, the master branch arbiter follows the same procedures and protocol outlined above with regard to the first embodiment of the present invention.

For example, if the master branch arbiter has been granted the mastership based upon Normal Priority Grant Requests, and if it identifies a High Priority Grant Request coming from the other branch arbiter (via the root arbiter), the master branch arbiter takes the primary GRI signal from the temporary bus master hub by notifying the temporary bus master hub that it should release the bus mastership. The temporary bus master hub then completes its current packet transmission and releases the mastership. Once the primary GRC line 56 is released, the master branch arbiter releases the secondary GRC line 76. The other branch arbiter then receives the secondary GRI signal from the root arbiter 68, becomes the master branch arbiter, and appoints the appropriate hub as the temporary bus master hub.

Further, if the temporary bus master hub (which has been given the mastership for normal requests) sees a high priority request from one of its own ports, it will notify its respective branch arbiter, the master branch arbiter, through its primary HRQ line 66. The branch arbiter will then following the procedure for dealing with high priority requests as discussed above with regard to the first embodiment. Additionally, the respective branch arbiter will transmit the information to the root arbiter 68. The root arbiter 68 will not change anything, other than record the HRQ in one of its internal registers for bookkeeping purposes.

Once the master branch arbiter, that is, the designated branch arbiter, has accommodated all requests for the transmission of packets on the common memory bus coming from its associated hubs, it notifies the root arbiter 68 and releases its secondary Grant Captured signal from the GRC line 76. Once the secondary GRC signal has been released, the root arbiter 68 passes the mastership to the appropriate branch arbiter depending upon its internal round robin protocol.

The modular nature of the present system permits unlimited expansion, which could result in one large local hub with an almost unlimited number of available ports. Although the first and second embodiments only disclose coupling three and two hubs to arbiters, respectively, more hubs could be connected to the individual arbiters without departing from the spirit of the present invention. Additionally, more than two branch arbiters could be connected to a root arbiter without departing from the spirit of the present invention.

As stated previously, the hubs may be implemented by integrated circuit chips, although the invention is not restricted in scope in this particular manner. Integrated circuit chips offer the convenience of a relatively small size device at a relatively moderate cost. As previously suggested, more than one hub is employed in those situations that require communication among a relatively large number of remote stations for a single hub station due to limitations on the number of ports for a single integrated circuit chip. Nonetheless, alternatively, these local area hub network components may be implemented with alternative technologies other than integrated circuitry, such as, for example, discrete electrical circuit components or logic gates. Furthermore, hubs need not be restricted to implementation on a single integrated circuit chip. The invention is also not restricted in terms of the type of couplings employed to manually connect or couple the hubs and other components; however, typical interconnection such as, for example, electrical conductive wires, optical fibers, or coaxial cable connections are employed.

While the preferred embodiment of the present invention has been shown and described, it will be understood that it is intended to cover all modifications and alternate methods falling within the spirit and scope of the invention as defined in the appended claims or their equivalents.

What is claimed is:

1. A method for expanding the number of ports available to a local area hub network including a plurality of hubs connected along a memory bus, wherein said hubs must be granted controlling access to said memory bus before transmitting packets on said memory bus, comprising the steps of:

coupling a first branch arbiter to a first set of hubs, said first branch arbiter designates a hub, based upon internal protocols, temporary bus master hub by granting said temporary bus master hub controlling access to the common memory bus for transmission of a packet on said memory bus;

coupling a second branch arbiter to a second set of hubs, said second branch arbiter designates a hub, based upon internal protocols, temporary bus master hub by granting said temporary bus master hub controlling access to the common memory bus for transmission of a packet on said memory bus;

coupling a root arbiter to said first branch arbiter and said second branch arbiter, said root arbiter grants, based upon internal protocols, requests made by said first branch arbiter and said second branch arbiter for controlling access to said memory bus;

wherein said first branch arbiter may only grant a hub controlling access to said memory bus when said root arbiter has granted a request of said first branch arbiter for controlling access to said memory bus and said second branch arbiter may only grant a hub controlling access to said memory bus when said root arbiter has granted a request of said second branch arbiter for controlling access to said memory bus.

2. The method according to claim 1, wherein said first branch arbiter grants controlling access to said temporary bus master hub for transmission of a single packet and said second branch arbiter grants controlling access to said temporary bus master hub for transmission of a single packet.

3. The method according to claim 1, further including the step of providing a primary grant request line coupled between each of said first set of hubs and said first branch arbiter permitting said first set of hubs to request controlling access to said memory bus and a primary grant request line coupled between each of said second set of hubs and said second branch arbiter permitting said second set of hubs to request controlling access to said memory bus.

4. The method according to claim 3, further comprising the steps of providing a primary high priority grant request line coupled between each of said first set of hubs and said first branch arbiter and a primary normal priority grant request line coupled between each of said first set of hubs and said first branch arbiter, and providing a primary high priority grant request line coupled between each of said second set of hubs and said second branch arbiter and a primary normal priority grant request line coupled between each of said second set of hubs and said second branch arbiter.

5. The method according to claim 1, further including the step of providing a primary grant capture line coupled to said first set of hubs, said second set of hubs, said first branch arbiter and said second branch arbiter, said primary grant capture line permitting said temporary bus master hub to send a grant captured signal to other hubs indicating that said temporary bus master hub has controlling access to said memory bus for the purpose of transmitting a packet.

6. The method according to claim 1, further including the step of providing a primary grant in line coupled between each of said first set of hubs and said first branch arbiter permitting said first branch arbiter to designate said temporary bus master hub and a primary grant in line coupled between each of said second set of hubs and said second branch arbiter permitting said second branch arbiter to designate said temporary bus master hub.

7. A local area hub network having an expandable number of ports, comprising:

a first set of hubs and a second set of hubs coupled along a common memory bus, wherein each hub includes a plurality of ports for interfacing with remote stations;

a first branch arbiter coupled to said first set of hubs for designating a hub, based upon an internal protocol, temporary bus master hub by granting said temporary bus master hub controlling access to said memory bus for transmission of a packet on said memory bus;

a second branch arbiter coupled to said second set of hubs for designating a hub, based upon an internal protocol, temporary bus master hub by granting said temporary bus master hub controlling access to said memory bus for transmission of a packet on said memory bus;

a root arbiter coupled to said first branch arbiter and said second branch arbiter, said root arbiter grants requests made by said first branch arbiter and said second branch arbiter based upon internal protocols;

wherein said first branch arbiter may only grant a hub controlling access to said memory bus when said root arbiter has granted a request of said first branch arbiter for controlling access to said memory bus and said second branch arbiter may only grant a hub controlling access to said memory bus when said root arbiter has granted a request of said second branch arbiter for controlling access to said memory bus.

8. The network according to claim 7, wherein said first branch arbiter grants controlling access to said temporary bus master hub for transmission of a single packet and second branch arbiter grants controlling access to said temporary bus master hub for transmission of a single packet.

9. The network according to claim 7, further a primary grant request line coupled between each of said first set of hubs and said first branch arbiter permitting said first set of hubs to request controlling access to said memory bus and a primary grant request line coupled between each of said second set of hubs and said second branch arbiter permitting said second set of hubs to request controlling access to said memory bus.

10. The network according to claim 9, further including a primary high priority grant request line coupled between each of said first set of hubs and said first branch arbiter and a primary normal priority grant request line coupled between each of said first set of hubs and said first branch arbiter; and a primary high priority grant request line coupled between each of said second set of hubs and said second branch arbiter and a primary normal priority grant request line coupled between each of said second set of hubs and said second branch arbiter.

11. The network according to claim 7, further including a primary grant capture line coupled to said first set of hubs, said second set of hubs, said first branch arbiter, and said second branch arbiter, said primary grant capture line permitting said temporary bus master hub to send a grant captured signal to other hubs indicating that said temporary bus master hub has controlling access to said memory bus for the purpose of transmitting a packet.

12. The network according to claim 7, further including a primary grant in line coupled between each of said first set of hubs and said first branch arbiter permitting said first branch arbiter to designate said temporary bus master hub and a primary grant in line coupled between each of said second set of hubs and said second branch arbiter permitting said second branch arbiter to designate said temporary bus master hub.

13. A local area hub network having an expandable number of ports, comprising:

a first set of hubs and a second set of hubs coupled along a common memory bus, wherein each hub includes a plurality of ports for interfacing with remote stations;

a first branch arbiter means coupled to said first set of hubs for designating a hub, based upon an internal protocol, temporary bus master hub by granting said temporary bus master hub controlling access to said memory bus for transmission of a packet on said memory bus;

a second branch arbiter means coupled to said second set of hubs for designating a hub, based upon an internal protocol, temporary bus master hub by granting said temporary bus master hub controlling access to said memory bus for transmission of a packet on said memory bus;

a root arbiter means coupled to said first branch arbiter means and said second branch arbiter means for granting requests made by said first branch arbiter means and said second branch arbiter means based upon internal protocols;

wherein said first branch arbiter means may only grant a hub controlling access to said memory bus when said root arbiter means has granted a request of said first branch arbiter means for controlling access to said memory bus and said second branch arbiter means may only grant a hub controlling access to said memory bus when said root arbiter means has granted a request of said second branch arbiter means for controlling access to said memory bus.

14. The network according to claim 13, wherein said first branch arbiter means grants controlling access to said temporary bus master hub for transmission of a single packet and second branch arbiter means grants controlling access to said temporary bus master hub for transmission of a single packet.

15. The network according to claim 13, further including a primary grant request line coupled between each of said first set of hubs and said first branch arbiter means permitting said first set of hubs to request controlling access to said memory bus and a primary grant request line coupled between each of said second set of hubs and said second branch arbiter means permitting said second set of hubs to request controlling access to said memory bus.

16. The network according to claim 15, further including a primary high priority grant request line coupled between each of said first set of hubs and said first branch arbiter means and a primary normal priority grant request line coupled between each of said first set of hubs and said first branch arbiter means; and a primary high priority grant request line coupled between each of said second set of hubs and said second branch arbiter means and a primary normal priority grant request line coupled between each of said second set of hubs and said second branch arbiter means.

17. The network according to claim 13, further including a primary grant capture line coupled to said first set of hubs, said second set of hubs, said first branch arbiter means, and said second branch arbiter means, said primary grant capture line permitting said temporary bus master hub to send a grant captured signal to other hubs indicating that said temporary bus master hub has controlling access to said memory bus for the purpose of transmitting a packet.

18. The network according to claim 13, further including a primary grant in line coupled between each of said first set of hubs and said first branch arbiter means permitting said first branch arbiter means to designate said temporary bus master hub and a primary grant in line coupled between each of said second set of hubs and said second branch arbiter means permitting said second branch arbiter means to designate said temporary bus master hub.

* * * * *